United States Patent
Debroche

(10) Patent No.: US 6,969,438 B2
(45) Date of Patent: Nov. 29, 2005

(54) HIGH-SPEED CUTTING DEVICE AND METHOD FOR CUTTING A TIRE REINFORCEMENT

(75) Inventor: Claude Debroche, Cebazat (FR)

(73) Assignee: Sedepro, Paris (FR)

( * ) Notice: Subject to any disclaimer, the term of this patent is extended or adjusted under 35 U.S.C. 154(b) by 69 days.

(21) Appl. No.: 09/837,523

(22) Filed: Apr. 18, 2001

(65) Prior Publication Data

US 2002/0003020 A1 Jan. 10, 2002

(30) Foreign Application Priority Data

Apr. 18, 2000 (FR) .................................... 00 05071

(51) Int. Cl.[7] .......................... B29D 30/30; B29D 30/46
(52) U.S. Cl. ....................... 156/117; 156/130; 156/397; 156/406.4
(58) Field of Search .......................... 156/117, 397, 123, 156/130, 133, 406.4, 264, 265; 83/37, 304

(56) References Cited

U.S. PATENT DOCUMENTS

| | | | |
|---|---|---|---|
| 3,894,906 A | 7/1975 | Pearce et al. | |
| 4,640,164 A | * 2/1987 | Pavlov | 83/304 |
| 4,791,973 A | 12/1988 | Davisson | |
| 4,914,997 A | 4/1990 | Belvederi | 83/156 |
| 4,941,378 A | 7/1990 | Snyder | 83/350 |
| 5,281,289 A | 1/1994 | Debroche et al. | 156/117 |
| 5,395,476 A | * 3/1995 | Debroche et al. | 156/397 |
| 5,655,427 A | 8/1997 | Infanger | 83/673 |
| 6,032,560 A | * 3/2000 | Puchovsky | 83/304 |

FOREIGN PATENT DOCUMENTS

EP 0745462 12/1996

\* cited by examiner

*Primary Examiner*—Geoffrey L. Knable
(74) *Attorney, Agent, or Firm*—Cohen, Pontani, Lieberman & Pavane

(57) ABSTRACT

A cutting device and method in which a reinforcement is guided to a cutoff point where it is cut by a knife driven by a rotary shaft and carried along a closed path which brings the knife into cutting relationship with the reinforcement during predetermined cycles.

7 Claims, 4 Drawing Sheets

HIGH-SPEED CUTTING DEVICE AND METHOD FOR CUTTING A TIRE REINFORCEMENT

BACKGROUND OF THE INVENTION

The present invention concerns the manufacture of tires. More precisely, it relates to the manufacture of reinforcements, in particular, for a tire crown.

It is known that tires are usually reinforced by monofilaments or cables or other assemblages of unitary strands, which will be generically designated by the term "reinforcement" in the present application. An important architecture parameter is the angle formed by those reinforcements in relation to a standardized reference well known to the experts, namely, the median plane perpendicular to the axis of rotation of the tire. The present invention pertains, notably, to reinforcements at zero degree, whatever the exact location of those reinforcements in the tire. The reinforcements can be made by depositing a single cord individually or by depositing several cords simultaneously, for example, a dozen parallel cords. The term "cord" as used herein refers without distinction to a single strand, like a monofilament, or to an assemblage of unitary strands, like a cable, and the term "reinforcement" refers without distinction to a single cord or a group of parallel cords. The cords can be bare or pre-coated with rubber or any other material capable of rendering the cords adhesive.

The state of the art contains numerous examples of use of zero degree reinforce-ments for reinforcing the sidewalls or the crown of tires. But such an arrangement has the major disadvantage that the tire blank in production no longer lends itself or lends itself poorly to shaping during the subsequent phases of tire manufacture.

In order to provide a solution to these problems of shaping, a well known technique consists of cutting the cords at zero degree into sections. It is appropriate to call the piece of cord lying between the cuts a "section." U.S. Pat. No. 4,791,973 illustrates this technique. A tire containing a belt including zero degree cords is described there. The latter are not circumferentially continuous. A number of sections succeed one another along a perimeter.

As it is very difficult to cut a reinforcement in rapid procession at very high speeds, this principle leads to rates of laying zero degree reinforcements that are much too slow, particularly if only one cord at a time is deposited and not a group of parallel cords, winding the reinforcement on the blank being made while moving a reinforcement laying head transversely. If depositing a single ply is envisaged, for example, by winding said ply in one turn on the bare blank during its assembly, it is necessary to prepare the desired incisions on said ply in advance, and that method requires providing a welding overlap in order to ensure the recovery of circumferential tensile stresses.

SUMMARY OF THE INVENTION

The object of the invention is to propose very rapid cutting means, whether these cuts are frequent, as in the case described above, or cutting takes place only at the end of the tire operation, as in the case of zero degree filament yarn reinforcements. The invention makes it possible to envisage, under good conditions of industrial performance, the laying of cord sections for any reinforcement application at all.

The invention proposes a method of manufacture of a tire reinforcement, made up of a reinforcement delivered by feed means requiring a forward movement at a given linear speed in the longitudinal direction of the reinforcement, consisting of depositing sections of said reinforcement on a support and retaining said sections on the support by adherence to the latter, said sections being taken up below the feed means as follows:

sliding said reinforcement in a tubular guide, the lower end of which defines a cutoff point;

driving a knife by means of a rotary shaft control along any closed path bringing the knife into the environment of the cutoff point, the knife being active at the cutoff point on demand.

Cutting on demand can be done with suitable actuating gear. As a variant, the design of the control is such that the knife is active at the cutoff point every n passage, n being greater than or equal to two.

The invention proposes turning a knife at very high speed and, with appropriate kinematics, arranging for the knife not to be active on each passage close to the reinforcement. In the use described below, the invention takes advantage of the arrangement known per se of the planet gear existing in some gear trains. That enables the knife to describe a path lying within a plane.

Thus, the invention proposes a machine for manufacture of a tire reinforcement, said machine including a reinforcement distributor requiring a forward movement of the reinforcement at a given linear speed in the longitudinal direction, and a cutting device comprising:

a tubular guide in which said reinforcement is inserted and in which it slides, the lower end of said tubular guide defining a cutoff point of the reinforcement;

a knife mounted rotating on a shaft driven in rotation by a planet gear engaged on a fixed toothed wheel, the planet gear being driven by a planet carrier so that the planet gear rolls on the fixed toothed wheel, said cutting device being set up so that the knife describes a path which crosses the reinforcement at said cutoff point;

the machine further including application means receiving the reinforcement below the cutoff point, channeling it to a point for laying the reinforcement on a support for manufacture of the reinforcement on the support.

The invention makes direct fabrication possible on a support from spools from which the reinforcement is continuously withdrawn. The support in question can be a revolving form on which a crown block is fabricated, or a drum supporting the raw tire in the course of manufacture, or any other suitable support, the invention not dealing per se with that aspect. For the reinforcement laid to remain in place on the support, it is advantageous for the support to be coated with a layer of raw rubber to which the reinforcement can stick or adhere, or into which the reinforcement can penetrate at least slightly as it is brought on the support.

DESCRIPTION OF THE DRAWINGS

The invention will be better understood from the description to follow, given nonlimitatively with reference to the attached drawings in which.

DESCRIPTION OF PREFERRED EMBODIMENTS

Figure 1:
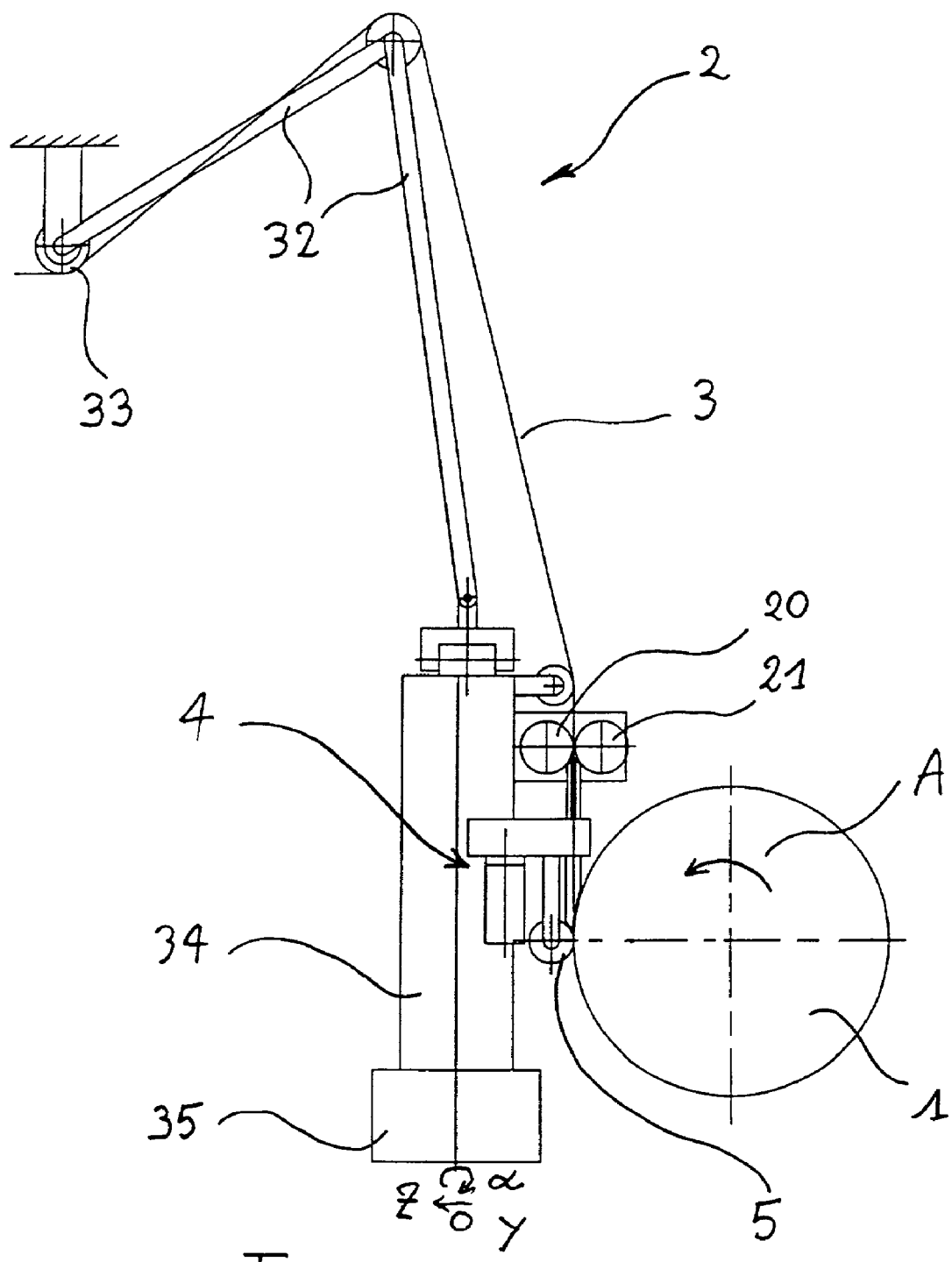
FIG. 1 is a schematic view showing the main parts used for laying a zero degree reinforcement.

FIG. 1 shows a support 1 on which a reinforcement is fabricated. That support could consist of any type of form defining the surface on which the cord sections constituting the reinforcement are to be placed, like, for example, a reliable reinforced diaphragm, or a diameter-adjustable form of the type used in machines for fabricating crown blocks, requiring a purely cylindrical profile, or a transversely curved form. The support 1 is pre-coated with all the constituents it must receive before addition of the zero degree reinforcement. The support 1 is driven in rotation in the direction indicated by arrow A.

A reinforcement distributor 2 is shown, adapted specifically for delivering a single cord 3, without that being interpreted as limiting the scope of the invention, which extends to any type of reinforcement. The cord 3 is unwound from a spool (not shown). The cord 3 is engaged on different pulleys of a guide system 32 enabling it to be guided from a point fixed in space (pulley 33) to a laying head 34 movable in space. A robot 35 with three axes (Y, Z, α) makes it possible to ensure the correct presentation of the cord 3 anywhere on the surface of the support 1, even when the support is not cylindrical.

On the laying head, the cord 3 is moved by two rollers 20, 21 between which it is gripped. Roller 20 is driven by a motor (not represented) feeding the cord 3. As has become standard, the feed motor can contain a coder or a resolver. It is thus possible to impart a very precise linear feed to the cord 3, while constantly knowing the exact metering of the quantity of cord 3 delivered to the parts of the machine set up down the line.

At the outlet of the rollers 20, 21, the cord 3 is inserted in a cutting device 4, installed on the laying head 34. Just like the cord distributor, the cutting device is in this example adapted to a reinforcement consisting of a single cord. Below the cutting device 4, preferably, an application roller 5 presses the cord 3 against the support 1 in order to make it slightly penetrate the rubber with which the support 1 is coated. The application roller 5 is represented fixed on the attached drawing, but it can be spring urged in a radial direction relative to the support.

Figure 2:
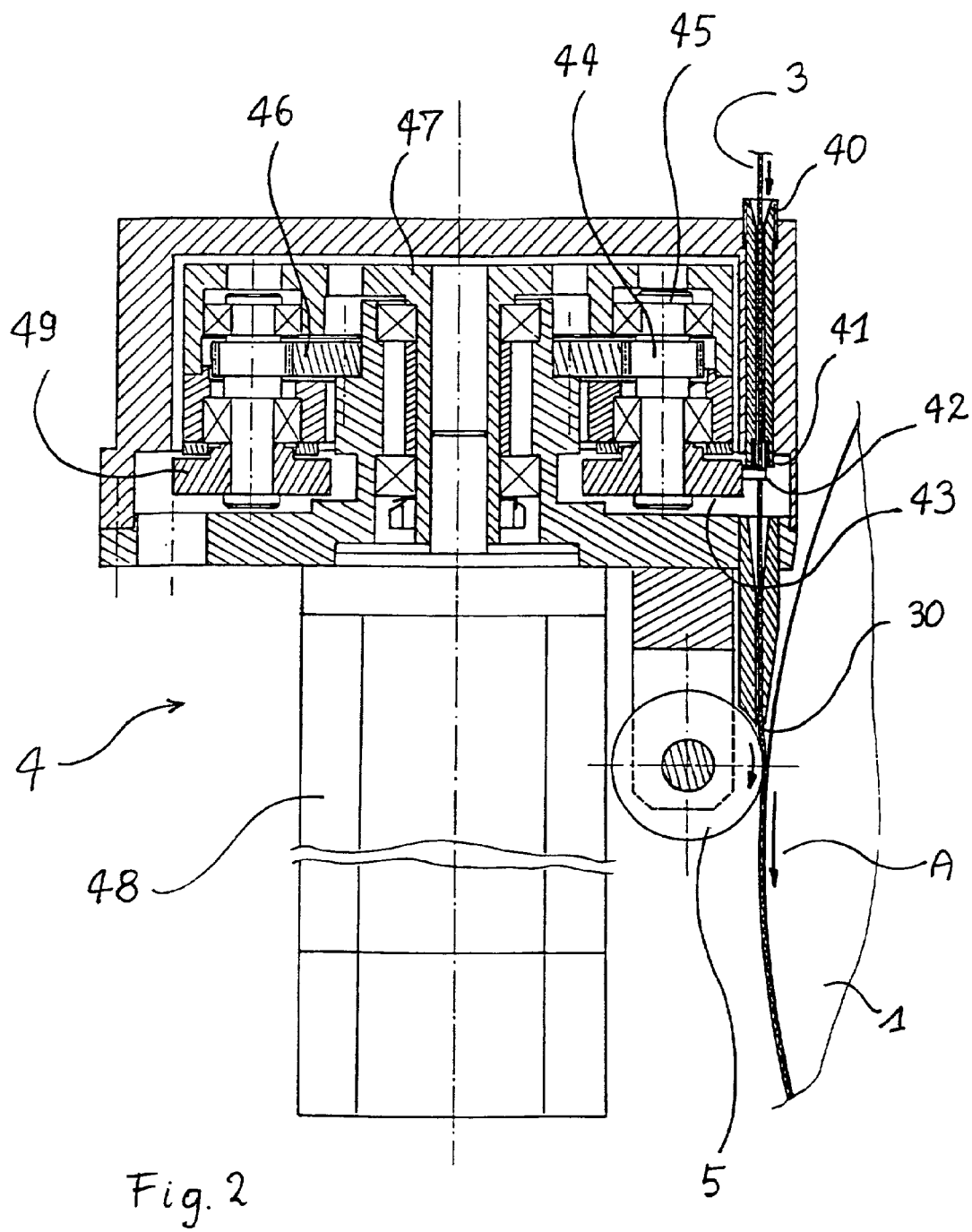
FIG. 2 is a more detailed view of a cutting device according to the invention.

In FIG. 2 a tubular guide 40 is shown, the discharge end 41 of which determines the cutoff position and holds the cord 3 when it is sectioned, A knife 42 is mounted on a disk 43 integral with a planet gear 44 (the disk 43 and the planet gear 44 being mounted rotating on the same shaft 45). The planet gear 44 is engaged with a toothed wheel 46 fixedly mounted, that is, not turning (this could be either an internally or externally annular gear or any other suitable arrangement). The shaft 45 is mounted on a planet carrier 47 driven in rotation by a motor 48. The device 4 can contain one or more other non-active auxiliary disks, such as the auxiliary disk 49 with corresponding planet gear(s), notably, for reasons of balancing.

Figure 3:
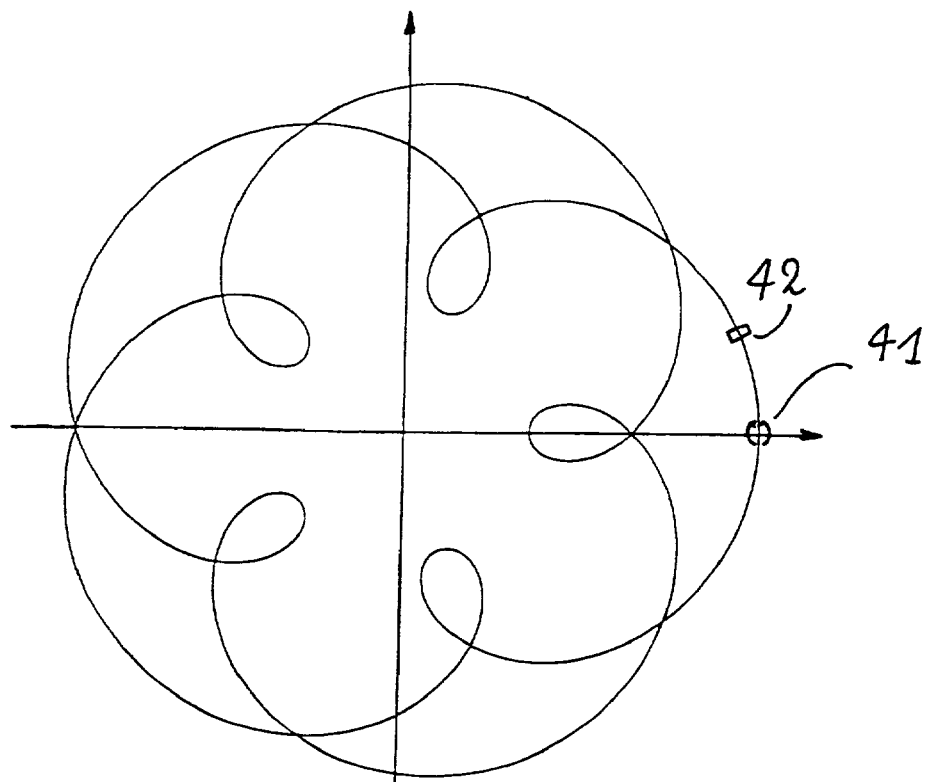
FIGS. 3 and 4 illustrate the path of a cutting tool according to two variants of the invention.
Figure 4:
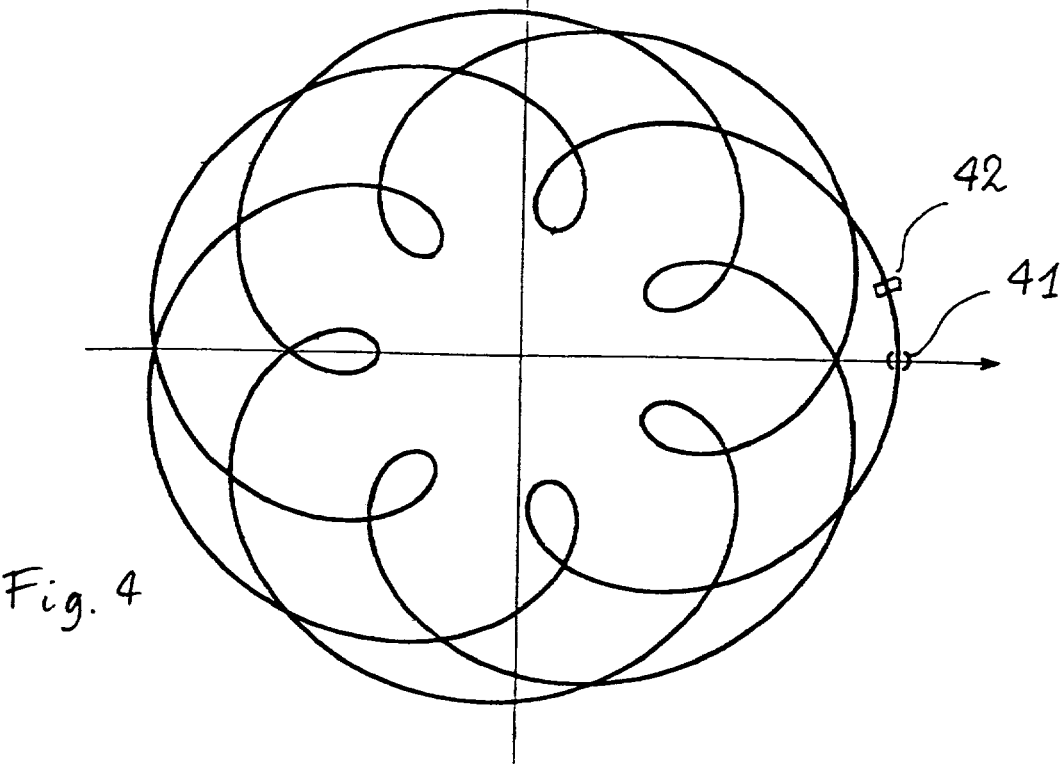

Thus, on each turn of the planet carrier 47, the knife 42 can describe several turns, according to the gear reduction due to the ratio between the number of teeth of the planet gear 44 and of the toothed wheel 46. Let us further note that, according to the ratio chosen, the knife will be presented at the cutoff point at the discharge 41 only after a number of turns of the planet carrier 47. FIG. 3 illustrates the path of the knife 42 when it returns to the cutoff point every two turns of the planet carrier 47, and FIG. 4 illustrates the path of the knife 42 when it returns to the cutoff point every three turns of the planet carrier 47.

Due to that gear reduction effect and to the possible choice of number of turns of the satellite carrier between two cutting actions of the knife 42, it is possible to reconcile high speeds of the knife 42 with a relatively low unwinding speed of the cord. The length of the cord sections 30 laid on the support 1 can then be very easily adapted by wisely choosing the gear reduction ratio mentioned above. In addition, high-speed cutting facilitates the cutting of harder-to-cut fibers like, for example, aramide.

It is important to note that cutting stops the cord 3 for only as short a time as possible. There is then no problem of accumulation of cord continuing to be pushed by the rollers 20 and 21 above the knife 42. Although at the time the cord 3 is sectioned, it is immobilized for a very brief instant, the cutting proposed by the invention is so rapid that the tubular guide 40, if only because of the play enabling the cord 3 to slide, can momentarily contain the quantity of cord 3 which continues to be propelled by the rollers 20, 21

After cutting, the cord section 30 no longer benefits from motor drive by the rollers 20 and 21 installed up the line. That is why the space between the cutoff point and the laying point is preferably regulated so that the last end of the cord 3 created by the previous cutoff rejoins the laying point on the support 1 just before the cord 3 is cut again. After cutting, the movement of the section 30 is caused by rotation of the support 1 to which it adheres. In order to positively ensure the feed of the cord sections freed by cutting, it is preferably advisable for the distance between the point of contact of the application roller on the support and the cutoff point to correspond at most to the length of the sections. Let us point out that if the kinetic energy accumulated by the sections is sufficient, it is possible to ensure the operation of the machine described, even if the distance between the point of contact of the application roller on the support and the cutoff point is greater than the maximum mentioned above.

Figure 5:
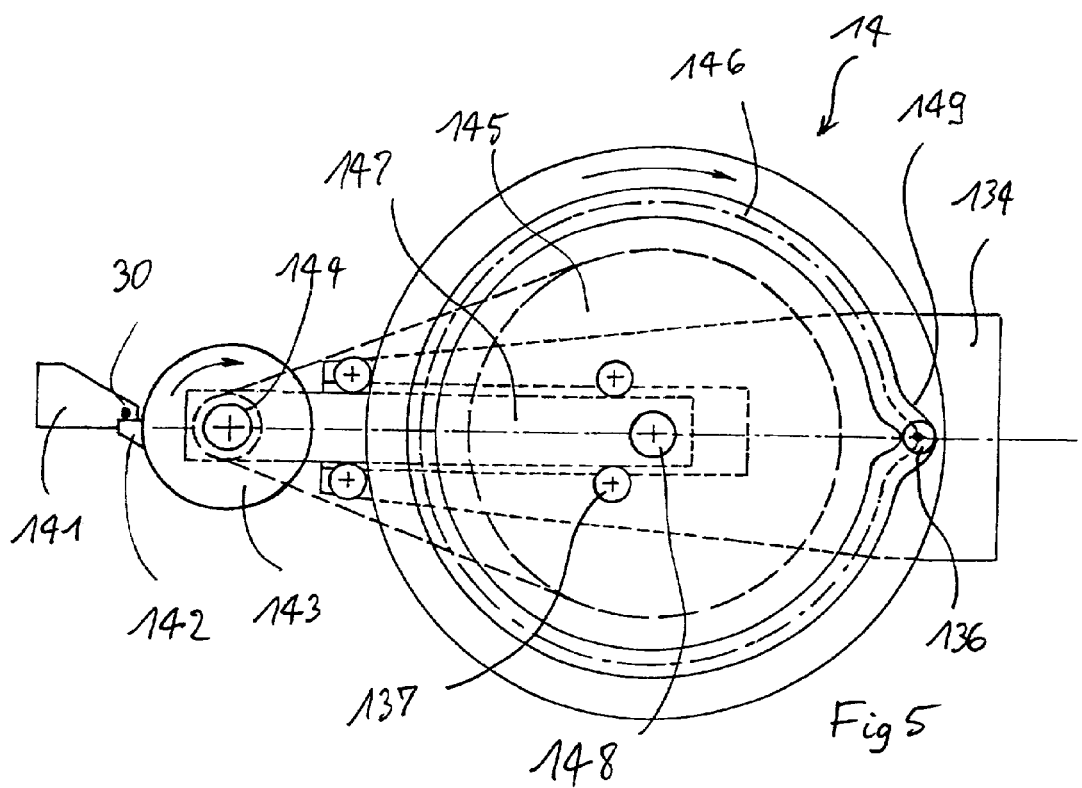
FIGS. 5 and 6 illustrate another embodiment of the invention.
Figure 6:
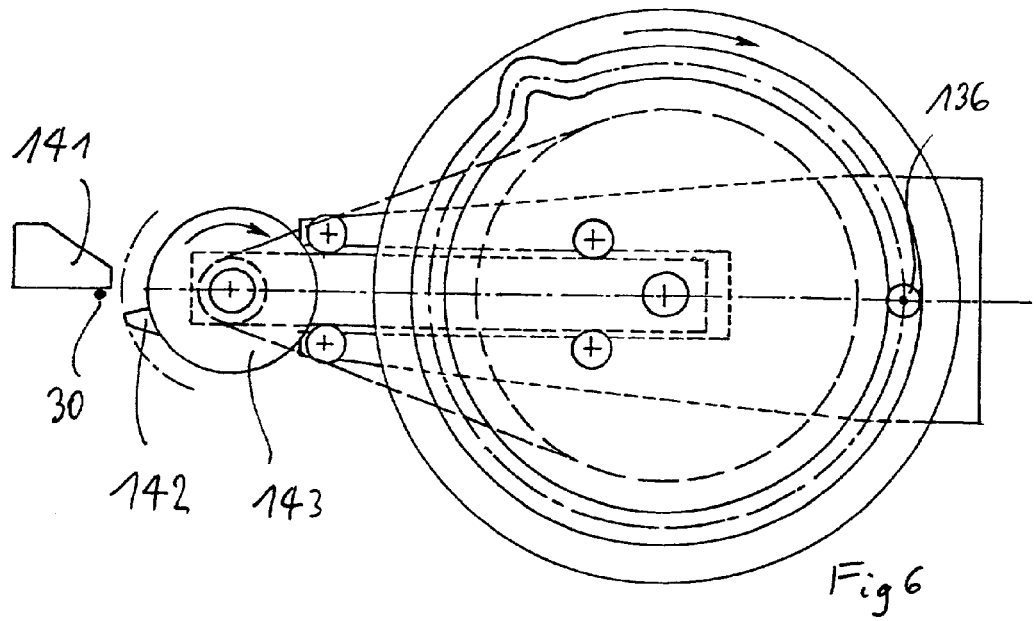

In FIGS. 5 and 6, a cutting device 14 is represented, constituting another embodiment which can be substituted for the cutting device 4 of FIG. 1. The cutting device 14 is mounted on a laying head 134. It contains a guide comparable to guide 40, along which said reinforcement is inserted, the end 141 of said guide defining a reinforcement cutoff point. A knife 142 is shown mounted on a rotary disk 143 driven in rotation by a gear 145 (via a belt shown by a broken line), the gear 145 being integral on rotation with a cam 146. A bar 147 supports the pin 144 of the disk 143 and the pin 148 of the assembly formed by the cam 146 and the gear 145. The bar 147 is guided by rollers 137 mounted on the laying head 134. The cam 146 and the disk 143 are thus mounted sliding in relation to the laying head 134. The cam contains an outwardly extended part 149 which cooperates with a stud 136 integral with the laying head 134. The knife 142 is continuously driven at high speed. It is in inactive position in FIG. 6 and, at the right time, advances to the cord 3 in order to cut it (see FIG. 5). The cutting device 14 is then so set up that the knife 142 describes a path which crosses the reinforcement at said cutoff point, when the outwardly extended part 149 of the cam is engaged by the stud 136.

In light of this specification, the expert may easily produce variants and use adaptations without departing from the scope of this invention. It may be desired, for example, to lay textile cords. All cords not presenting any compression resistance must necessarily be kept very taut. A pneumatic propulsion of the type shown by the reference numeral 56 in U.S. Pat. No. 3,894,906 can be used whenever that is necessary.

I claim:

1. A method for applying tire reinforcement sections to a support using a machine for manufacturing the tire reinforcement sections, the machine including a guide for guiding a reinforcement cord along a longitudinal direction of the reinforcement cord to a cutoff point, a cutting device for cutting the reinforcement cord at the cutoff point at a predetermined cutting interval to form the tire reinforcement sections, the cutting device comprising a knife-supporting disk, a knife mounted on the knife-supporting disk, and a motor driving an input shaft, wherein the knife-supporting disk is coupled to the input shaft by a drive connection, the method comprising the steps of:

feeding the reinforcement cord through the guide to the cutoff point;
  driving the input shaft by the motor at a selected input shaft rotational speed;
  rotating and moving the knife-supporting disk by the drive connection in response to only the driving of the input shaft such that knife speed and the cutting interval are both controlled only by said selected input shaft rotational speed, and the knife moves along a closed path which passes proximate the cutoff point but passes through the cutoff point only every n passes of the knife proximate the cutoff point, wherein n is greater than or equal to two, the reinforcement cord being cut to form the tire reinforcement sections when the knife passes through the cutoff point; and
  depositing the cut tire reinforcement section onto the support.

2. The method of claim 1, wherein said closed path lies within a plane.

3. The method of claim 1, wherein the knife is held at a fixed position on the knife-supporting disk.

4. The method of claim 1, wherein said step of depositing comprises applying the cut tire reinforcement section to a point of contact on the support by an application roller bearing against the support, the application roller being driven by a movement of the support, wherein a distance between the point of contact and the cutoff point is not greater than a length of the cut tire reinforcement.

5. The method of claim 1, wherein the drive connection comprises a planet gear assembly including a planet carrier connected to the input shaft, a planet gear rotatably coupled to the planet carrier for rotating about an axis of rotation parallel to the input shaft and at a distance therefrom, and a fixed toothed wheel, and wherein said step of driving the input shaft comprises driving the planet carrier.

6. The method of claim 5, wherein the knife-supporting disk is coupled to the planet gear for rotation therewith about a common axis, the planet gear being engaged with the fixed toothed wheel, said step of rotating the knife-supporting disk comprising rotating the planet gear about the axis of rotation when the planet carrier is rotated by rolling of the planet gear on the fixed toothed wheel.

7. The method of claim 6, wherein said step of rotating and moving the knife-supporting disk further comprises operating the drive connection with a gear ratio between the number of teeth on the planet gear and the number of teeth on the toothed gear such that the knife passes through the cutoff point only every said n passes of the knife proximate the cutoff point during each revolution of the planet carrier.

* * * * *